(12) United States Patent
Koved et al.

(10) Patent No.: US 7,877,812 B2
(45) Date of Patent: Jan. 25, 2011

(54) METHOD, SYSTEM AND COMPUTER PROGRAM PRODUCT FOR ENFORCING PRIVACY POLICIES

(75) Inventors: Lawrence Koved, Pleasantville, NY (US); Marco Pistoia, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 1057 days.

(21) Appl. No.: 11/619,624

(22) Filed: Jan. 4, 2007

(65) Prior Publication Data

US 2008/0168527 A1    Jul. 10, 2008

(51) Int. Cl.
G06F 7/04 (2006.01)
(52) U.S. Cl. ............................... 726/27; 726/1; 726/10; 726/17; 726/22; 726/26; 713/165; 713/166; 713/167; 713/168
(58) Field of Classification Search ............... 726/1, 726/7, 22, 26–28, 10, 17; 713/165–168
See application file for complete search history.

(56) References Cited

U.S. PATENT DOCUMENTS

| | | | |
|---|---|---|---|
| 6,987,381 B2 | 1/2006 | Yano | |
| 2004/0221287 A1* | 11/2004 | Walmsley | 718/100 |
| 2004/0268141 A1 | 12/2004 | Zimmer et al. | |
| 2005/0044409 A1 | 2/2005 | Betz et al. | |
| 2005/0257244 A1 | 11/2005 | Joly et al. | |
| 2006/0026667 A1 | 2/2006 | Bhide et al. | |
| 2006/0048224 A1 | 3/2006 | Duncan et al. | |
| 2006/0048226 A1* | 3/2006 | Rits et al. | 726/22 |
| 2006/0059539 A1 | 3/2006 | Shashikumar et al. | |
| 2007/0016937 A1* | 1/2007 | Bassett et al. | 726/1 |
| 2007/0226807 A1* | 9/2007 | Ginter et al. | 726/27 |

OTHER PUBLICATIONS

International Search Report, PCT/US2008/000008, Nov. 26, 2009.
Larry Koved et al., Access Rights Analysis for Java, OOPSLA, Nov. 4-8, 2002, IBM T.J. Research Center, Seattle, Washington, USA.
Marco Pistoia et al., Interprocedural Analysis for Privileged Code Placement and Tainted Variable Detection, IBM Watson Research Center, 2005, Yorktown Heights, NY.
Ulfar Erlingsson et al., IRM Enforcement of Java Stack Inspection, Feb. 19, 2000, Cornell University, Ithaca, NY.
Gleb Naumovich et al., Static Analysis of Role—Based Access Control in J2EE Applications, ACM SIGSOFT Software Engineering Notes, Sep. 2004, vol. 29, Issue 5, ACM Press, New York, NY.

(Continued)

*Primary Examiner*—Kambiz Zand
*Assistant Examiner*—Tongoc Tran
(74) *Attorney, Agent, or Firm*—Cantor Colburn LLP; Preston Young

(57) ABSTRACT

A method for enforcing privacy policies associated with data. The method includes accessing a database to identify labeled data in the database, the labeled data associated with a privacy policy. An access node accessing the label data is determined. For the access node accessing the labeled data, it is determined whether the access node applies an authorization test as indicated by the privacy policy. An authorization test is associated with the access node if the access node does not apply necessary authorization indicated by the privacy policy.

28 Claims, 2 Drawing Sheets

OTHER PUBLICATIONS

Paolina Centonze et al., Role-Based Access Control Consistency Validation, ISSTA '06: Proceedings of the 2006 International Symposium on software testing and analysis.

Marco Pistoia et al., When Role Models Have Flaws: Static Validation of Enterprise Security Policies, Sep. 19, 2006, IBM Research Division, Yorktown Heights, New York.

* cited by examiner

US 7,877,812 B2

METHOD, SYSTEM AND COMPUTER PROGRAM PRODUCT FOR ENFORCING PRIVACY POLICIES

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates to privacy, and particularly to a method, system and computer program product for enforcing privacy policies.

2. Description of Background

Access to data may be controlled by privacy policies that control access to the data by applications. Enabling privacy in IT systems is challenging for a number of reasons, including defining privacy policies and their associated auditing policies, creating authorization mechanisms to enforce those policies, and modifying existing applications so that appropriate authorization tests are performed. Solutions to the former two issues are being developed by multiple vendors and researchers. To solve the latter issue, it would be ideal to have tools for automatically identifying locations in applications where appropriate authorizations need to be performed; this issue has not been addressed yet. Currently, programmers must take the organization's privacy and auditing policies, information located in databases that is to be regulated according to the afore mentioned policies (including Privacy Identifying Information (PII)), APIs for call authorization mechanisms, and figure out how to modify existing applications so that calls to the authorization and auditing mechanisms are inserted at the right location within the programs. This can be a time consuming and error prone task.

Typically, enterprises store information about the operation of their organizations in database systems. This covers information about all aspects of the business, including their employees, customers, vendors, products, etc. This information may include information that is not generally known to the public and its disclosure could be embarrassing to the parties involved, violate corporate policies or laws that govern disclosure of such information. Regulations and best practices governing the disclosure of such information stipulate rules and guidelines for when and how such information may be disclosed.

To address regulatory compliance with respect to information access and disclosure, a number of companies have developed tools and techniques for labeling the data in databases and other information sources as to the nature of the data, such as whether the data is Personally Identifiable Information (PII), or is otherwise subject to business or regulatory compliance. Identifying and labeling the data is a first step for an enterprise to ensuring compliance with regulations associated with the data and its disclosure.

A Chief Privacy Officer (CPO) is responsible for ensuring that an organization enforces its privacy policies as it is implemented by the Information Technology (IT) systems within the organization. To understand whether the IT systems conform to the corporate privacy policies, the CPO needs to inspect each of the applications used by the organization to see which databases are used as inputs, which databases are created/updated, and where information is otherwise disclosed via messaging, services or presented to people (e.g., through Web interfaces). By using the information from the database labeling tools, it is possible to make a rough estimate of the information flows through these applications. However, in the absence of any detailed program analysis technologies (e.g., static analysis, runtime traces), the best the CPO can hope to learn about the flow of sensitive information is very coarse grained. Thus, it is very difficult, if not impossible, to validate whether the corporate privacy policies are enforced by the applications, or whether the organization is complying with regulations or corporate policies.

It is possible to perform static analysis of code to extract control- and data-flow information. Traditionally, static analysis has been employed to perform program optimizations by program compilers. Other recent uses of static analysis include bug finding (ITS4, RATS, BEAM, Coverity Prevent, SABER, SWORD4J, among others). The analysis techniques range from source to object code analysis, from intra- to inter-procedural analysis.

More recent programming models that target enterprises employ metadata to describe bindings between various software components that comprise an application. For Java Enterprise Edition (Java EE), formerly known as Java 2, Enterprise Edition (J2EE), this metadata is referred to as deployment descriptors. For Web Services, the metadata includes Web Services Description Language (WSDL). The metadata can also be used by static analyzers to construct the inter-component control and data flows.

Traditional systems, including operating systems, Java, and Microsoft .NET provide authorization mechanisms to enforce security policies, whereby a subject (e.g., a user or other system) is to be authorized to perform an operation on an object (e.g., a protected resource). In the case of privacy, this model is extended to include authorization for a specified purpose. A typical coding pattern is for the code to call an authorization module to perform the authorization test based on a triple (subject, operation, object); in the case of privacy, the authorization test is based on the quadruple (subject, operation, object, purpose). Any contextual information, such as code calling sequence, delegation or impersonation policies, physical location, time of day, etc. may also be included in the authorization test.

As described above, the process of determining how to modify existing applications so that calls to the authorization and auditing mechanisms are inserted at the right location within the programs can be a time consuming and error prone task. Thus, there is a need in the art for a system that automatically enforces privacy policies.

SUMMARY OF THE INVENTION

Exemplary embodiments include a method for enforcing privacy policies associated with data, the method including: accessing a database to identify labeled data in the database, the labeled data associated with a privacy policy; determining an access node accessing the label data; for the access node accessing the labeled data, determining whether the access node applies an authorization test as indicated by the privacy policy; associating an authorization test with the access node if the access node does not apply necessary authorization indicated by the privacy policy.

Exemplary embodiments further include auditing the access node after associating the authorization test with the access node to confirm enforcement of the privacy policy.

Exemplary embodiments further include wherein the privacy policy is in a tuple form.

Exemplary embodiments further include wherein the privacy policy is represented as (subject, operation, object, purpose).

Exemplary embodiments further include wherein the object in the privacy policy refers to one or more labeled data.

Exemplary embodiments further include wherein the subject in the privacy policy refers to a security role.

Exemplary embodiments further include wherein the determining access nodes accessing the label data includes building control flow representations for the access node.

Exemplary embodiments further include wherein the determining access nodes accessing the label data includes building data flow representations for the access node.

Exemplary embodiments further include wherein determining whether the access node applies an authorization test as indicated by the privacy policy includes determining that the access node complies with the privacy policy is represented as (subject, operation, object, purpose).

Exemplary embodiments further include wherein with a single control flow path to the access node, associating the authorization test with the access node includes identifying a program point that is in the control flow path prior to the access node and inserting the authorization test at the program point.

Exemplary embodiments further include wherein with multiple control flow paths to the access node, associating the authorization test with the access node includes identifying a program point that is common to the control flow paths prior to the access node and inserting the authorization test at the program point.

Exemplary embodiments further include wherein with multiple control flow paths to the access node, associating the authorization test with the access node includes identifying multiple program points in the control flow paths prior to the access node and inserting the authorization test at the multiple program points.

Exemplary embodiments further include wherein associating the authorization test with the access node includes updating the access node object code with the authorization test.

Exemplary embodiments further include wherein updating the access node object code with the authorization test includes updating an in-memory representation of the object code.

Exemplary embodiments further include wherein in an managed environment, associating the authorization test with the access node includes adding instructions to the managed environment to execute the authorization test prior to access node code.

The shortcomings of the prior art are overcome and additional advantages are provided through the provision of a System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, technically we have achieved a solution which confirms that access nodes enforce privacy policies, and modifies access nodes in the event that the access node does not include an authorization test.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

Embodiments use of a set of program analysis techniques, commonly referred to as static analysis, to automatically identify locations within software where privacy-enforcing and associated auditing code might be appropriate to comply with a set of privacy policies and their associated auditing policies, respectively. Exemplary embodiments suggest locations, within the software being examined, for optimal placement of privacy enforcing code and associated auditing code. These suggestions could be made within the context of an Integrated Development Environment (e.g., Eclipse, EMACS) or text report. Embodiments may automatically insert the authorization tests into the application without modifying the source code or deployment instructions for the application.

Embodiments relate to the enforcement of privacy policies, and assume that privacy and associated auditing policies are defined using one or more available tools. Tools can be used to identify the data associated with the privacy policies (including PII) in databases and other data sources. By using both sets of information, as well as the application code (including, but not limited to source and/or object and/or metadata), embodiments statically analyze the software and associated software artifacts to identify control and data flows through the program that result in access to data that has associated privacy policies. The static analysis can determine whether calls to appropriate authorization tests are performed when there is an access to the data for which there is a privacy and associated auditing policy. If not, embodiments suggest appropriate (e.g., optimal) places to insert privacy enforcement and associated auditing code. In addition, embodiments insert the appropriate code via a number of well known program transformation techniques. These include, but are not limited to, changes to the source code, deployment artifacts, and object code, and/or calls to authorization routines from the middleware that supports running the application.

Figure 1:
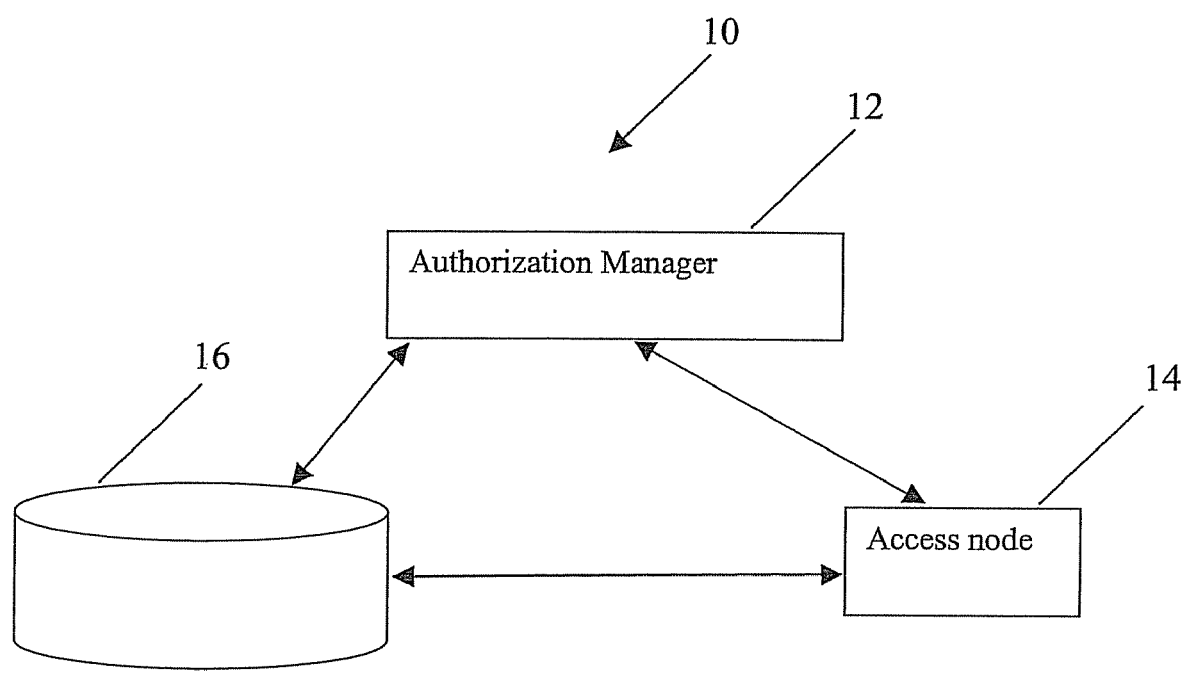
FIG. 1 illustrates one example of a system for enforcing privacy policies.

FIG. 1 illustrates one example of a system 10 for enforcing privacy policies. The system includes an authorization manager 12 that obtains privacy policies associated with data in database 16 and insertions of authorization code into access node 14 attempting to access the labeled data in database 16. The system 10 may be implemented on a general purpose computer. The authorization manager 12 may be implemented through a processor executing a computer program stored in memory accessible by the processor. Database 16 may exist in any form of memory available in the general purpose computer. Access node 14 may be any object attempting to access the database 16 and may include a software application, operation system, hardware resource, etc. It is understood that the authorization manager 12 may interface with multiple access nodes 14, and a single access node 14 is depicted for ease of illustration.

Figure 2:
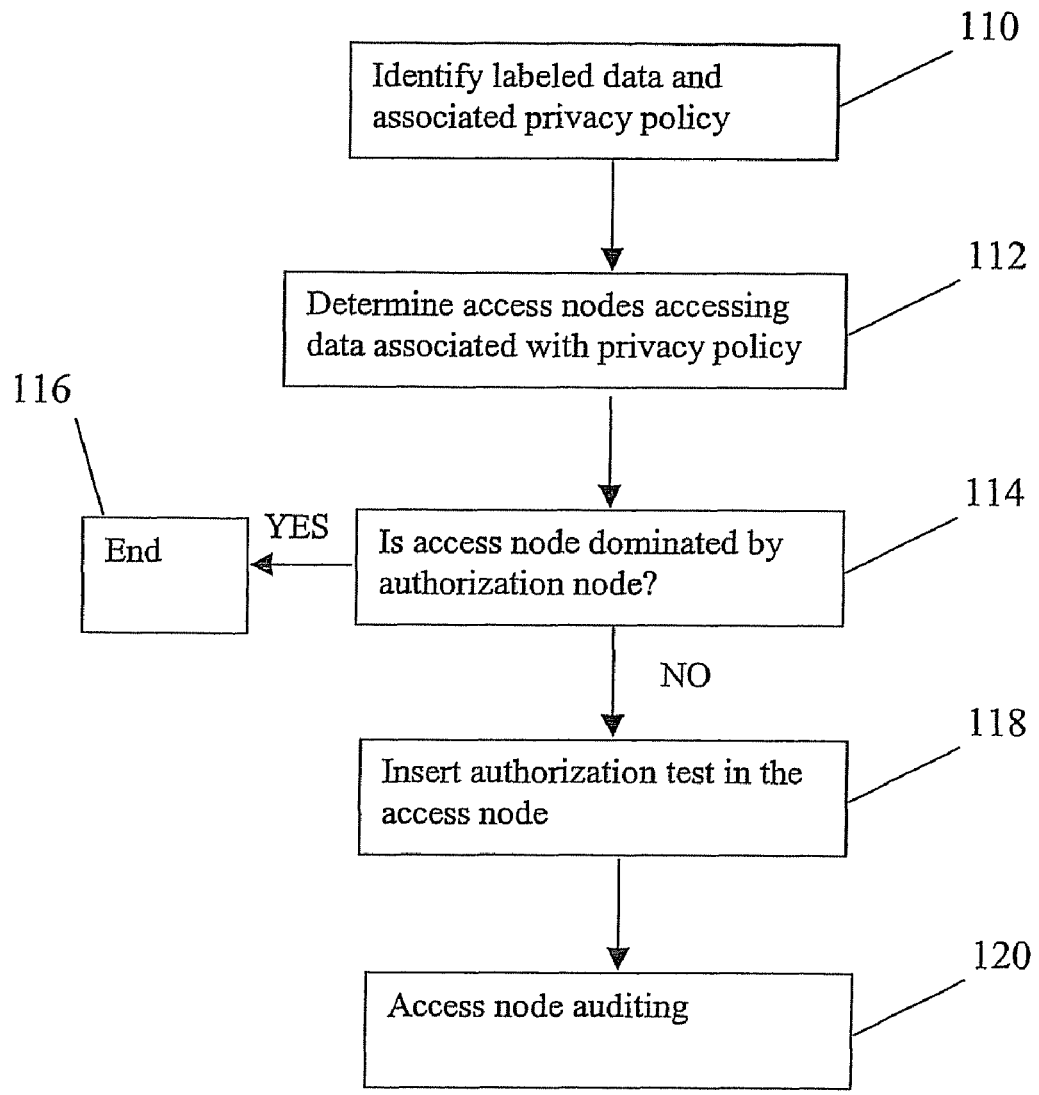
FIG. 2 illustrates one example of a process for enforcing privacy policies.

FIG. 2 illustrates one example of a process for enforcing privacy policies. The process begins at step 110 where the authorization manager 12 identifies privacy policies associated with labeled data in database 16. The authorization manager 12 accesses database 16 to detect labeled data (i.e., data associated with a privacy policy). This includes identifying the type of authorization required to access the labeled data (LD). The authorization manager 16 identifies the subset of the privacy and associated auditing policies for which there is associated labeled data (LD) that may be accessed by the application 14 and metadata to be analyzed.

Once the labeled data is identified, the authorization manager obtains the privacy and associated auditing policies. There are a multitude of technologies for describing these privacy policies. For the purposes of explanation of embodiments of the invention, the exemplary privacy policy is in the form of (subject, operation, object, purpose). This policy is defined so that "object" refers to one or more labeled data (LD). The "subject" may be mapped into security roles rather than individual users or security principles. The "operations" and "purpose" may be application- and/or organization-specific labels.

In embodiments of the invention, defining privacy policy and associated auditing policies, and labeled data (LD) may be an iterative process. One way to address the iterative nature of the process is through a tool that allows concurrent editing of policies and labeling of data in database 16 of the data sources in a way that identifies missing policies or missing labeled data (LD).

Once the labeled data (LD) has been identified in database 16, and the associated privacy policy determined, flow proceeds to step 112 where control flows and data flows are identified. As noted above, the labeled data (LD) identifies the data to be protected. The LD may be fields stored in a database, messages from a message queue, elements of Web Services request and/or response, etc. Only the LD for which there is an associated privacy policy, is of interest in step 112.

The authorization manager 12 uses the labeled data (LD) information to trace propagation of labeled data (LD) throughout an access node 14. This may include tracing the labeled data (LD) across software and hardware components to determine which software and/or hardware accesses the labeled data. The authorization manager 12 may perform a static analysis of the access node 14 to build control and data flow representations of the software. Software artifacts such as deployment descriptors, configuration files, etc. may be used to improve the scalability and accuracy of the control and data flows created. The control and data flows need sufficient granularity to be useful for subsequent processing. Existing techniques may be used compute the control and data flows for access node 14. In exemplary embodiments, the control flows and data flows are represented as graphs. Step 112 identifies portions of access node 14 that access the labeled data associated with a privacy policy.

At step 114, the authorization manager 12 determines if the access node 14 applies a suitable authorization test to access the labeled data. Embodiments use an authorization mechanism that performs authorization based on tuples of the form (subject, operation, object, purpose). It is understood that other algorithms may be used to authorize access to data. The authorization manager 12 determines whether the access to the labeled data by access node 14 is completely mediated by an appropriate authorization test based on the privacy policy (e.g., subject, operation, object, purpose). The authorization manager 12 computes whether the control-flow-graph node representing the access to the labeled data (LD) by access node 14 is dominated by an appropriate authorization-test node. The authorization node is appropriate if the authorization test satisfies the privacy policy (e.g., subject, operation, object, purpose) with respect to the labeled data (LD) being accessed.

If the labeled data (LD) access node is appropriately mediated by an appropriate authorization node, then no further processing of the labeled data (LD) access node 14 is needed and flow proceeds to step 116. If the access node 14 is not appropriately mediated by an appropriate authorization node, then flow proceeds to step 118 where an authorization test is inserted in the access node. Upon access of the labeled data by the access node, the authorization test is executed to ensure that the privacy policy associated with the label data is met.

Depending on the type of access node 14, the insertion of the authorization test may be performed in a variety of ways. In an interactive development environment (IDE), if there is a single control flow path to the access node 14, the authorization manager 12 identifies a program point in the source code that is in the control flow path prior to access node 14. The authorization test based on the associated privacy policy can be inserted at this point in the code. This may require refactoring of the code, as is typically supported in modern IDEs.

If there is more than a single control flow path to the access node 14, there are multiple options for adding an authorization test. A first option is to identify a program point in the source code that is common to all control flow paths prior to the access node 14. The authorization test based on the associated privacy policy can be inserted at this point in the code. One technique for identifying the appropriate program point is to use an algorithm such as partial redundancy elimination. The authorization test code insertion may require refactoring of the code, as is typically supported in modern IDEs.

A second option when there is more than a single control flow path to the access node 14 is to identify multiple program points in the source code that that will result in all labeled data (LD) accesses to be covered by an appropriate authorization test based on the associated privacy policy. The authorization tests code can be inserted at these points in the code. This may require refactoring of the code, as is typically supported in modern IDEs.

Outside the IDE environments, automated transformation of the object code or in-memory representation of the software can be updated directly. Algorithmically, this is very similar to the IDE algorithms described above. The primary difference is that instead of identifying locations in the source code for inserting appropriate authorization tests, the changes are made to the object code or to the in-memory representation of the object code. Examples of object code manipulation tools include BCEL (Byte Code Engineering Library). Updating in-memory representations of object code is known to those skilled in the art; particularly for those skilled in algorithms for dynamically optimizing compilers. Thus, the authorization manager 12 may update the access node 14 code using such techniques.

In alternate embodiments, the access node 14 runs in a managed environment (e.g., .NET or Java EE). In these embodiments, the authorization manager 12 computes the control flow paths from the entry points to the labeled data (LD) access. The authorization test may be automatically added to the access node 14. Specifically, the authorization manager 12 adds information that instructs the managed environment on the appropriate authorization test to be performed before execution of this access node code, based on the privacy policy. The information concerning the authorization test may be added to the deployment metadata.

Alternatively, in a managed environment the authorization manager 12 may issue recommendations to the user. Specifically, authorization manager 12 may recommend appropriate authorization test(s) as possible additional authorization requirements for the specified entry points into the access node code. The user may then manually insert the authorization tests into the access node code.

When the processing of step 118 is completed, flow proceeds to step 120 where for each access node modified in step 118, the authorization manager 12 confirms that the authorization test is implemented through an auditing operation. The auditing may be performed in a manner similar to step 118, the difference being that the authorization manager 12 now detects whether the control-flow-graph node for access node 14 representing the access to the labeled data (LD) is post-dominated (rather than dominated) by an appropriate auditing-enforcing node. This guarantees that any sequence of operations subsequent to a labeled data access contains an appropriate auditing operation.

The problem of auditing privacy enforcement is similar to the problem of enforcing privacy policies via authorization tests. Just as access to data that has a privacy policy associated with it, such access may have an associated auditing requirement. Access to such data is followed by an auditing (e.g., logging) operation at step 118. The purpose of auditing is to be able to verify who has performed operations on the data through access node 14, what has been performed by each subject and for what purpose.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for enforcing privacy policies associated with data, the method comprising:
   accessing a database to identify labeled data in the database, the labeled data associated with a privacy policy;
   determining an access node accessing the label data;
   for the access node accessing the labeled data, determining whether the access node applies an authorization test as indicated by the privacy policy;
   associating an authorization test with the access node if the access node does not apply necessary authorization indicated by the privacy policy;
   wherein with a single control flow path to the access node, associating the authorization test with the access node includes identifying a program point that is in the control flow path prior to the access node and inserting the authorization test at the program point;
   wherein with multiple control flow paths to the access node, associating the authorization test with the access node includes one of identifying a program point that is common to the control flow paths prior to the access node and inserting the authorization test at the program point and identifying multiple program points in the control flow paths prior to the access node and inserting the authorization test at the multiple program points.

2. The method of claim 1 further comprising:
   auditing the access node after associating the authorization test with the access node to confirm enforcement of the privacy policy.

3. The method of claim 1 wherein:
   the privacy policy is in a tuple form.

4. The method of claim 3 wherein:
   the privacy policy is represented as (subject, operation, object, purpose).

5. The method of claim 1 wherein:
   the determining access nodes accessing the label data includes building control flow representations for the access node.

6. The method of claim 1 wherein:
   the determining access nodes accessing the label data includes building data flow representations for the access node.

7. The method of claim 4 wherein:
   determining whether the access node applies an authorization test as indicated by the privacy policy includes determining that the access node complies with the privacy policy is represented as (subject, operation, object, purpose).

8. The method of claim 1 wherein:
   associating the authorization test with the access node includes updating the access node object code with the authorization test.

9. The method of claim 8 wherein:
   updating the access node object code with the authorization test includes updating an in-memory representation of the object code.

10. The method of claim 1 wherein:
    in a managed environment, associating the authorization test with the access node includes adding instructions to the managed environment to execute the authorization test prior to access node code.

11. The method of claim 1 wherein:
    associating auditing with the access node includes updating the access node object code with the auditing.

12. The method of claim 11 wherein:
    updating the access node object code with the auditing includes updating an in-memory representation of the object code.

13. The method of claim 1 wherein:
    in a managed environment, associating auditing with the access node includes adding instructions to the managed environment to execute the auditing prior to access node code.

14. A system for enforcing privacy policies associated with data, the system comprising:
- a database including labeled data associated with a privacy policy;
- access nodes accessing the database; and
- an authorization manager coupled to the database and the access node, the authorization manager implementing a process of:
  - determining an access node accessing the label data;
  - for the access node accessing the labeled data, determining whether the access node applies an authorization test as indicated by the privacy policy;
  - associating an authorization test with the access node if the access node does not apply necessary authorization indicated by the privacy policy
  - wherein with a single control flow path to the access node, associating the authorization test with the access node includes identifying a program point that is in the control flow path prior to the access node and inserting the authorization test at the program point;
  - wherein with multiple control flow paths to the access node, associating the authorization test with the access node includes one of identifying a program point that is common to the control flow paths prior to the access node and inserting the authorization test at the program point and identifying multiple program points in the control flow paths prior to the access node and inserting the authorization test at the multiple program points.

15. The system of claim 14 wherein:
the authorization manager implements auditing the access node after associating the authorization test with the access node to confirm enforcement of the privacy policy.

16. The system of claim 14 wherein:
the privacy policy is in a tuple form.

17. The system of claim 16 wherein:
the privacy policy is represented as (subject, operation, object, purpose).

18. The system of claim 14 wherein:
the determining access nodes accessing the label data includes building control flow representations for the access node.

19. The system of claim 14 wherein:
the determining access nodes accessing the label data includes building data flow representations for the access node.

20. The system of claim 17 wherein:
determining whether the access node applies an authorization test as indicated by the privacy policy includes determining that the access node complies with the privacy policy is represented as (subject, operation, object, purpose).

21. The system of claim 14 wherein:
associating the authorization test with the access node includes updating the access node object code with the authorization test.

22. The system of claim 21 wherein:
updating the access node object code with the authorization test includes updating an in-memory representation of the object code.

23. The system of claim 14 wherein:
in a managed environment, associating the authorization test with the access node includes adding instructions to the managed environment to execute the authorization test prior to access node code.

24. The system of claim 14 wherein:
associating auditing with the access node includes updating the access node object code with the auditing.

25. The system of claim 24 wherein:
updating the access node object code with the auditing includes updating an in-memory representation of the object code.

26. The system of claim 14 wherein:
in a managed environment, associating auditing with the access node includes adding instructions to the managed environment to execute the auditing after the access node code.

27. A computer program product comprising a computer useable medium including a computer readable program, wherein the computer readable program when executed on a computer causes the computer to implement:
- accessing a database to identify labeled data in the database, the labeled data associated with a privacy policy;
- determining an access node accessing the label data;
- for the access node accessing the labeled data, determining whether the access node applies an authorization test as indicated by the privacy policy;
- associating an authorization test with the access node if the access node does not apply necessary authorization indicated by the privacy policy;
- wherein with a single control flow path to the access node, associating the authorization test with the access node includes identifying a program point that is in the control flow path prior to the access node and inserting the authorization test at the program point;
- wherein with multiple control flow paths to the access node, associating the authorization test with the access node includes one of identifying a program point that is common to the control flow paths prior to the access node and inserting the authorization test at the program point and identifying multiple program points in the control flow paths prior to the access node and inserting the authorization test at the multiple program points.

28. An authorization manager for enforcing privacy policies associated with data, the authorization manager implementing:
- accessing a database to identify labeled data in the database, the labeled data associated with a privacy policy;
- determining an access node accessing the label data;
- for the access node accessing the labeled data, determining whether the access node applies an authorization test as indicated by the privacy policy;
- associating an authorization test with the access node if the access node does not apply necessary authorization indicated by the privacy policy;
- wherein with a single control flow path to the access node, associating the authorization test with the access node includes identifying a program point that is in the control flow path prior to the access node and inserting the authorization test at the program point:
- wherein with multiple control flow paths to the access node, associating the authorization test with the access node includes one of identifying a program point that is common to the control flow paths prior to the access node and inserting the authorization test at the program point and identifying multiple program points in the control flow paths prior to the access node and inserting the authorization test at the multiple program points.

* * * * *